United States Patent [19]
Pepping et al.

[11] 3,995,122
[45] Nov. 30, 1976

[54] END MARK CONTROLLED SWITCHING SYSTEM AND METHOD

[75] Inventors: Bernard J. Pepping, Downers Grove; William A. Fechalos, Naperville, both of Ill.

[73] Assignee: Wescom, Inc., Downers Grove, Ill.

[22] Filed: May 27, 1975

[21] Appl. No.: 581,034

[52] U.S. Cl. .................... 179/18 GF; 340/166 R
[51] Int. Cl.² ................. H04Q 3/50; H04M 3/00
[58] Field of Search ......... 179/18 GF, 18 GE, 18 F, 179/18 G, 18 GC, 18 H, 19; 340/166 R, 166 EL

[56] References Cited
UNITED STATES PATENTS 3,393,276   7/1968   Edström ................. 340/166 R
3,801,749   4/1974   Jovic ..................... 340/166 R Primary Examiner—Thomas A. Robinson
Attorney, Agent, or Firm—Leydig, Voit, Osann, Mayer & Holt, Ltd.

[57] ABSTRACT

An end mark controlled switching system including a crosspoint matrix and a plurality of single ended junctors for linking paths within the matrix. The single ended junctors are adapted to link matrix inlets by firing crosspoints associated with such inlets into a common matrix outlet thereby using the matrix outlet itself as the link. The single ended junctors include means for refiring linked paths to allow insertion of additional inlets into existing connections.

23 Claims, 4 Drawing Figures

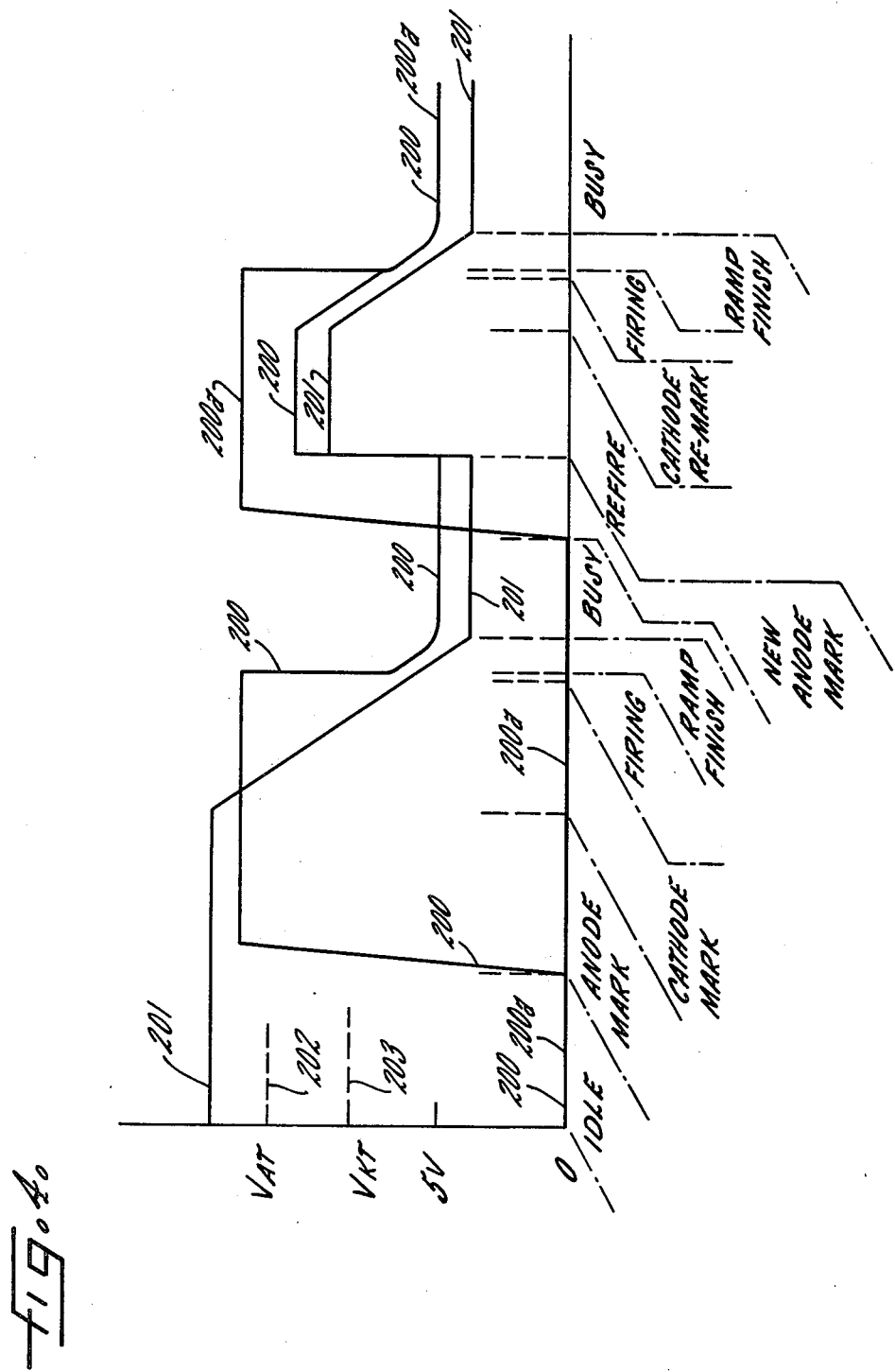

END MARK CONTROLLED SWITCHING SYSTEM AND METHOD

This invention relates to switching systems, and more particularly, to those using end mark controlled matrices for linking selected inputs.

Switching systems and switching matrices have been used extensively in applications such as telephone exchanges where it is necessary to provide selective interconnection among a plurality of circuits such as line circuits, trunks, etc., in a manner which will allow any circuit access to any other circuit. Such systems have evolved to include electronic crosspoints at the respective matrix junctions, thereby miniaturizing the system and increasing its speed of operation. Additionally, matrices using electronic crosspoints have been developed for end mark control whereby application of marking voltages to a matrix inlet and a matrix outlet fires the crosspoint coupling that inlet and outlet. It is seen that such systems simplify the matrix configuration since the end marking signals not only uniquely identify the desired inlet and outlet, but they also control the switching function. A switching system of the foregoing type is disclosed in Bradbery et al. U.S. Pat. No. 3,828,314 entitled End Mark Controlled Switching System and Matrix.

Switching systems of the foregoing type have utilized double ended junctors for interconnecting individual matrix paths in order to couple the signals within such paths. For example, if it were desired to electrically connect a first and second telephone coupled to respective matrix inlets, such systems would operate to fire a first path through the matrix coupling the first telephone to a first matrix outlet, and a second path through the matrix coupling the second telephone to a second matrix outlet, the respective outlets being linked in the junctor.

This mode of operation was necessitated, at least in part, by measures taken to assure that only a single crosspoint in any row, or in any column, could be fired at any given time. More specifically, in order to preclude the possibility of inadvertently firing additional crosspoints into a completed path, the systems and matrices were configured so that a fired crosspoint locked all of the crosspoints in the associated row and column into a condition where they were prevented from firing.

While switching systems of the foregoing type provide advantages over prior systems, they also possess certain limitations. Initially, it will be appreciated that such system are relatively complex. Additionally, the time to complete a connection requires a first period for firing the first matrix path and a second period for firing the second matrix path. Unless amplification is provided within the junctor, the junctor is characterized by an insertion loss. Finally, it is seen that a double ended junctor requires that two matrix outlet paths be utilized in order to complete a single connection.

In view of the foregoing, it is a general aim of the present invention to provide a switching matrix having superior operating characteristics than have been attainable heretofore. More specifically, it is an object of the present invention to provide a switching matrix having improved insertion loss and cross talk performance as well as increased system operating speed.

According to one aspect of the invention, it is an aim to increase the capabilities of switching matrices of manageable proportions by more effectively utilizing the crosspoints within such matrices. More specifically, an object of the invention is to provide a switching matrix wherein a plurality of selected matrix inlets may be fired to concurrently conduct into a single matrix outlet for linking the inlets. Further in this regard, it is an object to provide positive path control in such a matrix whereby spurious firing of crosspoints is eliminated.

According to another aspect of the invention, it is an object to provide a method for completing connections in an electronic end marked switching matrix by marking the inlets and outlets thereof so as to link a plurality of selected inlets in a single outlet.

A detailed object of the present invention is to provide a switching system utilizing a crosspoint matrix in conjunction with a plurality of single ended junctors thereby to reduce the number of crosspoints within the matrix. In that regard, it is a more specific object to provide a switching matrix wherein the crosspoints associated with a plurality of selected inlets may be fired into a single matrix outlet thereby to link such inlets.

These and other objects are accomplished in accordance with the present invention by providing a switching system configuration and a method for utilizing a matrix within such configuration whereby two or more selected inlets are linked using only a single matrix outlet. Realization of this mode of operation is based, in part, on the discovery that positive control may be maintained within the switching system while firing a plurality of inlets into a single outlet, and that the system may be controlled to refire completed paths to add new circuits to an existing link.

Other objects and advantages will become apparent from the following detailed description, taken in conjunction with the drawings, in which:

FIG. 4 is a diagram showing waveforms of the switching system of FIG. 1.

While the invention will be described in connection with a preferred embodiment, it will be understood that there is no intent to limit it to that embodiment. On the contrary, the intent is to cover all alternatives, modifications and equivalents falling within the spirit and scope of the invention as defined by the appended claims.

The preferred embodiment of the electronic switching system disclosed herein utilizes the Trigger Point Adjustable Diode (hereinafter TAD) thyristor as the crosspoint element, such device being disclosed in Andersen U.S. Pat. No. 3,725,683. Additionally, the gating and lockout circuitry for controlling such integrated circuit is disclosed in the aforementioned Bradbery U.S. Pat. No. 3,828,314. The TAD device, including its associated gating and lockout circuitry, is also described in the following publications: T. G. Anderson (sic), "The TAD Integrated Crosspoint Array," 1973 *IEEE International Solid-State Circuits Conference Digest of Technical Papers*, pp. 62–63, February 1973, and T. G. Andersen, "The TAD Integrated Crosspoint Array Application and Performance in Wescom's 501

EPABX", 1973 *International Conference on Communications*, pp. 19-1 – 19-12, June, 1973.

Accordingly, the crosspoint element will not be described in detail herein. However, it should be noted that the illustrated device has the following characteristics: The anode is end marked by applying a positive voltage thereto exceeding a predetermined threshold (such as 12 volts). The cathode is end marked by applying a voltage thereto which is below a predetermined threshold (such as 8.5 volts). The anode mark must be applied to the device a predetermined time before the cathode is end marked in order to switch the device into conduction. If the anode is properly end marked, internal gating circuitry will generate a gate pulse at the time the cathode voltage is decreased below the cathode threshold, thereby driving the device into conduction. The device is characterized by a holding current which is substantially greater than its firing current. The structure of the TAD thyristor having such characteristics is adequately described in the above referenced U.S. patents and publications. Additionally, it should be noted that while the utilization of the TAD device is preferred, the invention is not limited thereto, and other forms of end mark controlled electronic crosspoint elements may be used.

Figure 1:
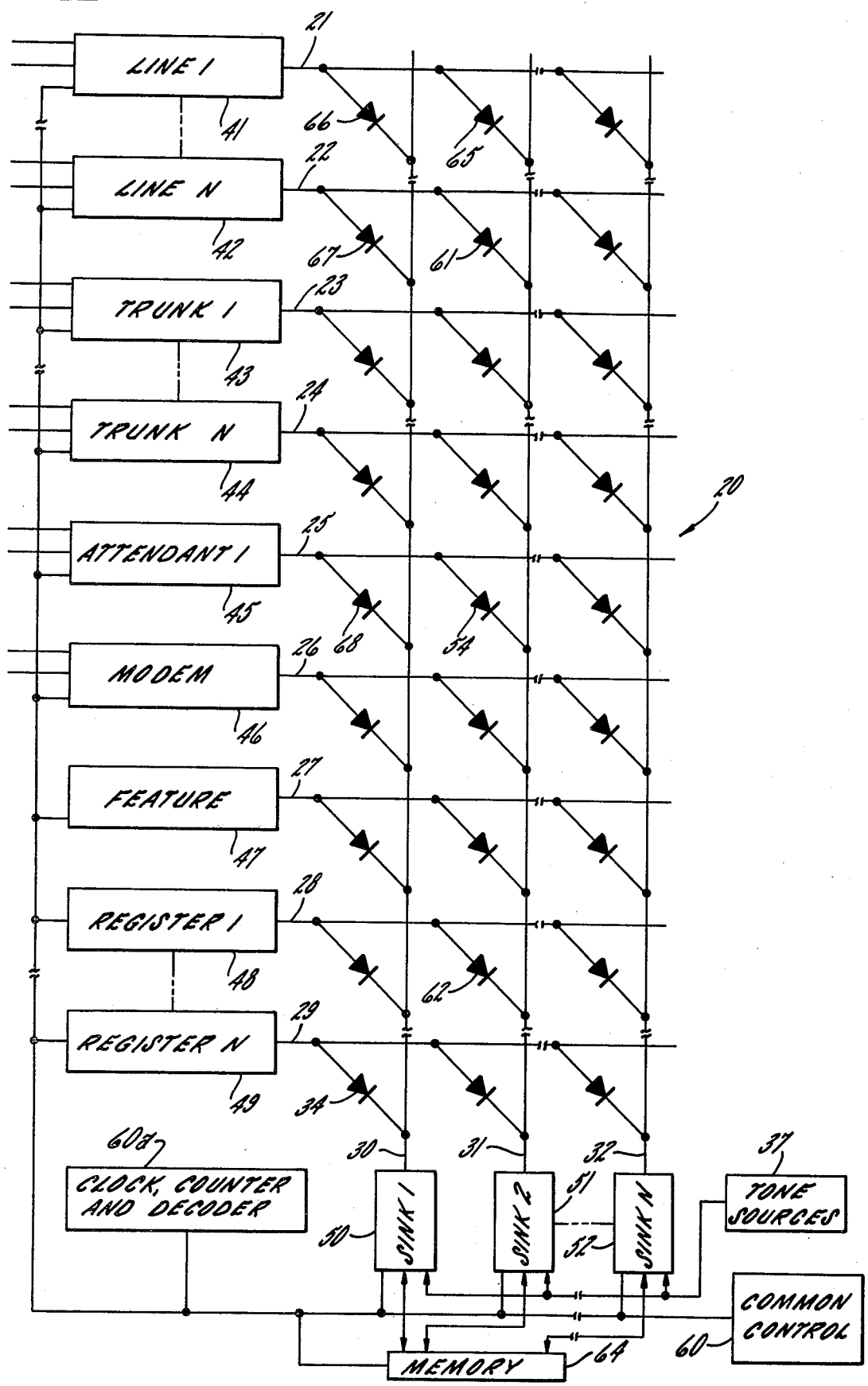
FIG. 1 is a fragmentary schematic diagram showing a switching system exemplifying the present invention.

Turning now to the drawings, and particularly to FIG. 1, there is shown a switching system exemplifying the present invention. The exemplary matrix, generally indicated at 20, comprises a plurality of inlet lines or horizontals 21–29 intersecting a plurality of outlet lines or verticals shown as 30–32. Disposed at the respective matrix intersections are electronic crosspoint elements, such as the crosspoint element 34 coupling the inlet line 29 to the outlet line 30. More specifically, the matrix inlets comprise a plurality of rows of thyristors having their anodes connected in common and their cathodes separately connected. Similarly, the matrix outlets comprise a plurality of columns of thyristors with their cathodes connected in common and their anodes separately connected. While the crosspoint elements are shown as simple diodes, it will be realized that in this preferred embodiment of the invention, the aforementioned TAD thyristor including associated gating and lockout circuitry is used.

In practicing the invention, input/output devices, such as telephones, trunks, etc. are interfaced to the switching system via respective input circuits, each of such circuits including an associated current source. Accordingly, line circuits 41, 42 are connected to the matrix inlets 21, 22 for interfacing respective telephones (not shown) to the switching matrix. It will be appreciated that the line circuits 41, 42 are merely representative of the greater number of telephone interfaces normally provided. Similarly, trunk circuits 43, 44 are coupled to the matrix inlets 23, 24, illustrating interfaces for incoming or outgoing telephone trunks. The attendant circuit 45, coupled to the matrix inlet 25 illustrates an interface for allowing an operator or attendant access to the switching system. The modem circuit 46, coupled to the matrix inlet 26, shows that data signals may be switched through the matrix. The data may take the form of analog tones produced by a modem in response to digital data, or, alternatively digital data may be directly switched through the matrix. The feature circuit 47, coupled to the matrix inlet 27 illustrates that other feature interfaces may also be coupled to the matrix; such features may, for example, provide no-loss conferencing between a plurality of input circuits.

In contrast with switching matrices known heretofore wherein the registers are coupled to the matrix outlets, the instant system provides registers coupled to the matrix inlets, illustrated as registers 48, 49 coupled to the matrix inlets 28, 29. It will, therefore, be appreciated that, in the instant system, the register circuits and means for control thereof are simplified by treating the registers in a manner similar to any of the other input-/output devices.

As will become apparent, in the illustrated embodiment, each of the circuits 41–49 includes a current source for selectively end marking the associated matrix inlet. End marking of the matrix outlets is accomplished by a plurality of current sinks, illustrated as current sinks 50–52 coupled to matrix outlets 30–32, respectively. Accordingly, activation of a particular currrent source and a particular current sink end marks the associated matrix inlet and outlet to identify a single crosspoint which will fire in response to the end marking voltages. For example, assuming that the current source within attendant circuit 45 is activated to end mark the matrix inlet 25, and that the sink circuit 51 is activated to end mark the matrix outlet 31, the electronic crosspoint 54, coupling the inlet 25 to the outlet 31 will fire to allow current flow from the current source within the attendant circuit 45 to the current sink 51.

In accordance with the invention, the switching system is configured to end mark two or more selected matrix inlets while end marking a single matrix outlet, so that the selected inlets will be linked within the matrix itself. More specifically, the current sources within two or more selected input circuits 41–49 will be caused to appropriately end mark the anodes of their associated TADs while an available current sink will similarly end mark the cathodes thereof. For example, line circuits 41 and 42 and attendant circuit 45 may all be caused to produce end marking signals, thereby end marking the anodes of all of the TADs in rows 21, 22 and 25. While maintaining the inlet end marks, an available current sink, such as current sink 50, may be caused to end mark the cathodes of all of the TADs in column 30. As a result, each of TADs 66, 67 and 68 will be fired thereby linking the line circuits 41 and 42 and the attendant circuit 45. It will be appreciated that the link joining each of the circuits is simply the matrix vertical 30. The nature of the link is, therefore, lossless, and only a single vertical is needed to provide the connection.

As will be appreciated by those skilled in the art, operation of the switching system is governed by a common control adapted to exert a supervisory control function over the switching system. For example, the common control sequentially interrogates the circuits surrounding the switching matrix to sense requests for service, such as are generated by a telephone going off hook. The control responds to such requests by linking the initiating telephone with a register, allowing the initiating telephone to dial the number of a desired terminating party. The common control further causes and supervises a busy check upon the line of the terminating party, and if such line is non-busy, links the originating party to the terminating party. The status of the link is monitored to detect termination of the connection. In short, the common control monitors the circuits surrounding the switching matrix in order to determine the present state of each circuit, to detect changes of state, to respond to state changes in a preprogrammed way, to selectively provide the functions within the capabilities of the system, and to update and maintain current status of the circuits in order to properly respond when subsequent state changes occur. It will be appreciated that the common control may take numerous forms in dependence upon the overall system requirements. Indeed, the common control may be configured as either a hard wired logic unit, or a stored program controller. Because of the numerous alternatives available to the system designer and the overall complexity of exemplary controls, the common control herein has been illustrated only in block form.

Referring again to FIG. 1, there is shown a common control 60, coupled to each of the input circuits 41–49 and to each of the current sinks 50–52. The clock, counter and decoder module 60a, forming a part of the common control 60 is similarly coupled. The clock, counter and decoder 60a functions to generate respective time slots for each of the current sinks, and to scan each of the input circuits during the respective sink time slots to detect any requests for service. For example, during the time slot for current sink 51, if a request for service is generated in line circuit 42 (in response to an off-hook condition of the telephone coupled to such line circuit), the common control 60 recognizes this request for service and sends a mark signal to the line circuit 42 and a similar mark signal to an available register, such as register 48. As will become more apparent, the respective mark signals actuate the current sources within the line circuit 42 and the register circuit 48 raising the voltage at the anodes of all TAD crosspoints coupled to matrix inlets 22 and 28 to a positive marking level. Additionally, the common control 60 sends a signal to the current sink 51, actuating the sink to end mark the cathodes of all of the TAD crosspoints coupled to matrix outlet 31. The common control also commands the memory 64 associated with the marked sink 51 to store the originator's time slot (the machine address for the originator). AS a result of these operations, the TAD crosspoints 61 and 62 experience end marking voltages at both their anodes and cathodes and are fitted into conduction. Thus, a matrix path is established between the line circuit 42 and the register 48, using the matrix vertical 31 as the link between such circuits.

When thus connected, the telephone coupled to line circuit 42 is provided with a dial tone, such tone being generated by tone source 37 and coupled to the current sink 51. The originating party, at the telephone coupled to the line circuit 42 is then able to dial the telephone number of the terminating party. Either dial pulsing or dual tone multifrequency signaling may be used to transmit signals corresponding to the number of the terminating party through the matrix to the register 48. The digits of the terminating party's number are received by the register 48 which, when the required number of digits are received, requests service from the common control. The common control recognizes the request, performs a translation of the dialed number to a machine address, and places such address in memory 64. Thus, at the termination of dialing, the memory 64 contains the identification of the originator's number and the terminator's number. After a busy check is made on the terminating party's line circuit by common control 60, the common control will release the connection between the register 48 and the sink circuit 51 by deenergizing the current source within the register 48, switching crosspoint 62 out of conduction. Crosspoint 61 is, however, maintained in conduction. The sink 51 then requests service from the common control to cause the source circuit which corresponds to the stored terminating number to be energized, thereby to end mark the matrix inlet coupled to such source circuit. Assuming that the party associated with the line circuit 41 is the terminating party, the common control will cause the line circuit 41 to energize the current source therein for end marking the matrix inlet 21. In order to fire the crosspoint associated with the selected inlet into the existing connection, the common control energizes a refire input associated with the current sink 51 which serves to raise the output voltage of the current sink above the end marking threshold and then return such voltage below the threshold. Such action allows the conductive crosspoint, in this case crosspoint 61 to be maintained in conduction during the entire operation because the current flow through the crosspoint is not diminished below the minimum holding level. However, raising the end marking voltage above the threshold and ramping such voltage through the threshold serves to fire the additional crosspoint, in this case crosspoint 65, causing both crosspoints 61 and 65 to conduct, thereby linking line circuits 41 and 42 within the matrix outlet 31. The current sources within the line circuits 41 and 42 supply holding current through their associated TADs 65 and 61 respectively into the common sink circuit 51. The line circuits are thus linked for communication, such link being maintained and controlled by the single current sink 51.

The advantages attendant to the system described above will be apparent when it is realized that switching matrices known heretofore require two matrix verticals and a double ended junctor in order to complete a comparable signal path. More specifically, the originating party, such as line circuit 42 would be coupled to the input port of the junctor via TAD 61 and matrix outlet 31. The terminating party would then be coupled to the output port of the double ended junctor via an entirely separate matrix path, for example TAD 66 and matrix outlet 30. It is seen, therefore, that the instant system requires only half the number of matrix verticals as systems known heretofore. Initially, this decreases the size, cost and complexity of the matrix itself. Secondly, as the cross talk performance of a matrix is determined in large part by the number of non-conducting TADs, decreasing the number of TADs improves the cross talk factor. Finally, realizing that systems known heretofore generally required a first time period for completing the circuit to the input port of the junctor and a second time period for completing the additional matrix path to the output port of the junctor, it is seen that the instant system effectively cuts the time required to complete a connection half. It will further be apparent that the instant system locks a completed connection into a condition whereby spurious firing of TADs into such connection are prevented, as described in the aforementioned Bradbery patent.

Figure 2:
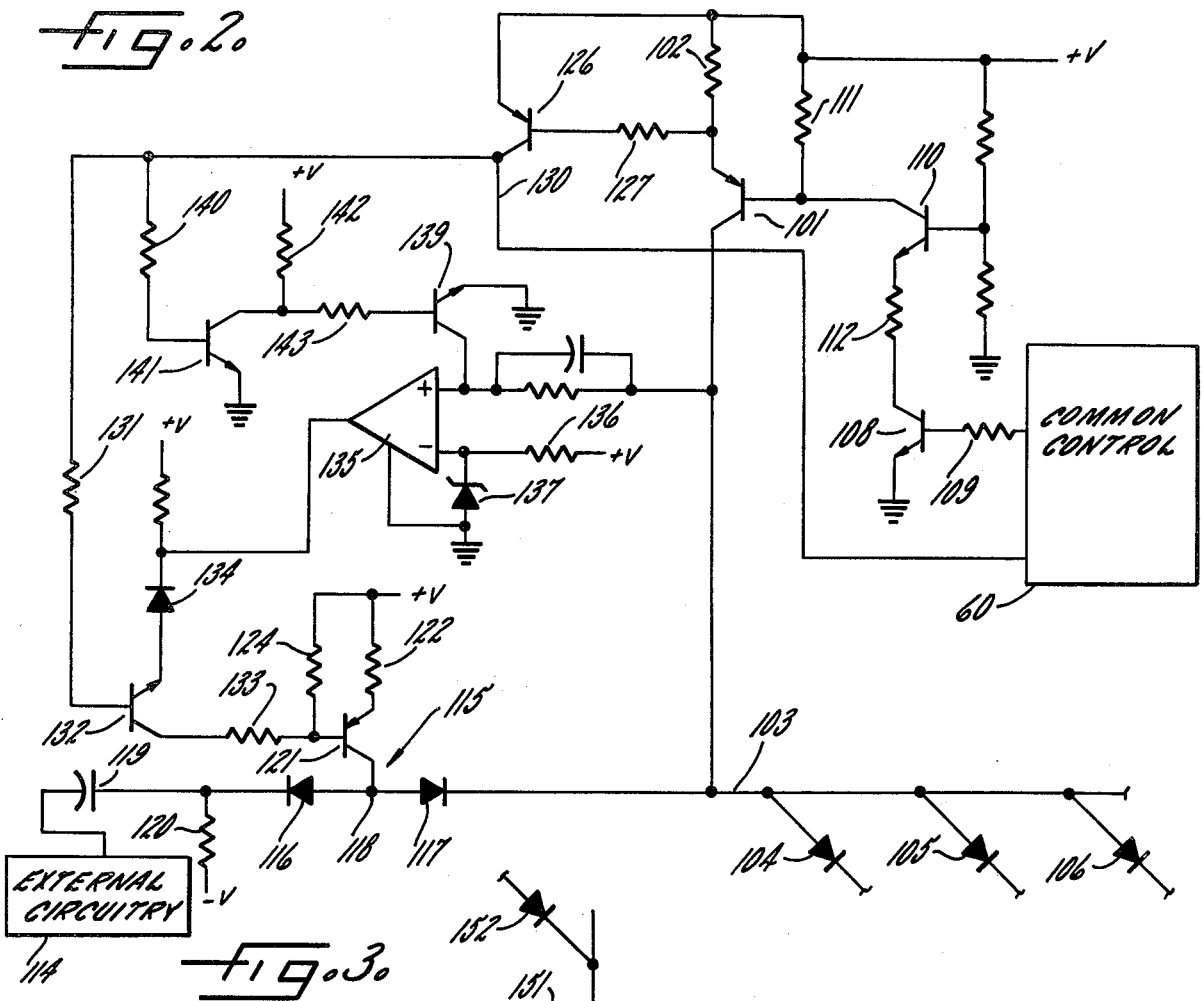
FIG. 2 is a current source for use in the system of FIG. 1.

Turning now to FIG. 2, there is shown the structure of an exemplary current source for use in the input circuits 41–49 and adapted to provide the anode end marking control described above. It will be appreciated that an identical current source is provided in each of the input circuits 41–49, simplifying the structure thereof by eliminating the need for special purpose end marking signal generators.

For providing an anode end marking voltage for firing TADs, and for providing a source of current to maintain fired TADs in conduction, a transistor 101 is provided having its emitter coupled via resistor 102 to a suitable supply of positive voltage and its collector coupled to a matrix inlet, shown as inlet 103 with the anodes of TADs 104, 105 and 106 coupled thereto. When transistor 101 is first switched into conduction, the current flow therethrough is comparatively light and, accordingly, the voltage at the matrix inlet 103 is maintained at a relatively high level, higher than the anode end marking threshold. However, when one of the TADs coupled to the inlet 103 is fired into conduction in response to a cathode end marking signal, the current drawn through resistor 102 and the emitter collector circuit of transistor 101 causes the voltage at inlet 103 to be reduced to a level below the anode marking threshold. Thus, the firing of one of the TADs coupled to the inlet 103 will serve to prevent the subsequent firing of the remaining TADs until conduction through the fired TAD is terminated.

For controlling the operation of the current source transistor 101, a switching transistor 108 is provided having its emitter coupled to circuit common and its base coupled via a resistor 109 to the common control 60. In the quiescent state, the common control 60 provides no base drive to transistor 108, thereby maintaining transistor 110 in the cut-off condition and similarly maintaining transistor 101 in the cut-off condition. In this state, no end marking voltage is applied to the TAD anodes coupled to the matrix inlet 103. However, when it is desired to fire a path from the inlet circuit including the illustrated current source, the common control 60 provides current through resistor 109 to the base of transistor 108, causing it to conduct. Current flow from the positive supply through resistor 111, the emitter collector circuit of transistor 110 and resistor 112 serves to establish a voltage at the base of transistor 101 for causing transistor 101 to end mark the anodes of its associated TADs. More specifically, transistor 101 will be driven into conduction, its collector being initially maintained at a relatively high level because of the low current drain of the load circuit including the associated TADs 104–106. Such condition may be referred to as the anode end marking condition before TAD conduction is initiated. Additionally, as noted above, conduction of holding current through one of the TADs 104–106 serves to lower the voltage on inlet 103 to a level below the anode threshold, a condition which may be referred to as TAD conduction.

For selectively coupling signals between the telephone or other device coupled to the input circuit (illustrated in FIG. 2 as external circuitry 114) and the matrix inlet 103, a speech gate generally indicated at 115 is provided. In the illustrated embodiment, the speech gate comprises a pair of diodes 116, 117 having their anodes connected at a junction 118. The cathode of diode 116 is coupled via a capacitor 119 to the external circuitry, typically including a line transformer, such circuitry the signal from the telephone or other device coupled to the input circuit. Similarly, the cathode of diode 117 is coupled to the matrix inlet 103 which in turn is coupled to the commoned anodes of TADs 104–106. A resistor 120, connected between the cathode of diode 116 and a suitable negative bias supply provides a first biasing input to the speech gate. The second biasing input is provided via transistor 121 having its collector coupled to the junction 118 and a resistor 122 coupled between its emitter and a positive bias supply. Thus, when the transistor 121 is conducting, the diode 116 is forward biased and, if one of the TADs 104–106 is fired, the diode 117 is forward biased. In such condition the speech gate is enabled and a voltage change at the cathode of one of diodes 116, 117 will be exhibited as a corresponding voltage change at the cathode of the other of said diodes. Thus, an input signal coupled through capacitor 119 will serve to vary the voltage at the TAD anodes. Similarly, a voltage variation at the TAD anodes will be coupled through the speech gate and through capacitor 119 to the external circuitry 114. However, when transistor 121 is switched off, the positive bias is removed from junction 118, disabling the speech gate to isolate the matrix input circuit 103 from the external circuitry 14. As will become more apparent, the speech gate is effective when refiring matrix paths to prevent switching transients within the matrix from being coupled to the external circuitry.

The transistor 121 is biased via a resistor 124 so that it is normally maintained in the cut-off condition maintaining the speech gate is a disabled condition. To allow communication through the matrix, means are provided for detecting the completion of a matrix path and for enabling the speech gate in response thereto. To that end, a transistor 126 has its base coupled via resistor 127 to the emitter of transistor 101. Accordingly, the transistor 126 is maintained in the cut-off condition whenever the current source is in its quiescent condition. Similarly, when the transistor 101 is caused to produce an end marking voltage, but before a matrix path coupled thereto is fired, the small amount of current drawn through resistor 102 is insufficient to allow transistor 126 to conduct. However, when one of the TADs coupled to the inlet 103 is fired, the current flow through resistor 102 increases, and the increased voltage drop across such resistor forward biases the base emitter junction of the transistor 126. Accordingly, transistor 126 is driven into conduction, raising the collector thereof to a high level. It is seen that the collector of transistor 126 is coupled via a lead 130 to the common control 60. Such lead is sensed by the common control, the high level thereof indicating that the current source is busy, i.e. that it is actually supplying current to a fired crosspoint. The signal on lead 130 also provides a self-latching function for the current source, being coupled through a release mechanism in the common control for maintaining the current source energized until the control acts to release the connection. The collector of transistor 126 is also coupled via a resistor 131 to the base of a transistor 132. Assuming for the moment that the emitter of the transistor 132 is biased so that current flow through resistor 131 will cause transistor 132 to conduct, it is seen that the sensing of a completed path through the matrix by transistor 126 drives transistor 132 into conduction. In this condition the current drawn through resistors 124 and 132 forward biases the base emitter junction of transistor 121 and, as described above, couples the positive bias source to the junction 118 of the speech gate. It is recalled that such condition enables the speech gate thereby to couple the external circuitry to the TAD anodes.

For disabling the speech gate in response to the detection of a refiring operation in the matrix, a comparator 135 is provided having its non-inverting input coupled to the matrix inlet 103 and its inverting input fixed at a predetermined level by the biasing resistor 136 and Zener diode 137. A transistor 139 is provided, coupled between the non-inverting input of the comparator 135 and circuit common, to clamp the comparator output at a low level whenever transistor 126 is non-conducting. This function, it is seen, is provided by coupling a resistor 140 between the collector of transistor 126 and the base of a transistor 141. Thus, whenever the transistor 126 is cut off, the transistor 141 is similarly cut off, and base drive is provided to transistor 139 through resistors 142 and 143. However, when transistor 126 is driven into conduction, base drive is provided to transistor 141 via resistor 140, clamping the transistor 141 into a saturated state of conduction, thereby removing the base drive from transistor 139 and enabling the comparator 135. In such condition, the comparator 135 is adapted to sense the fired or unfired condition of the TADs coupled to the matrix inlet 103, and to disable the speech gate in response to the unfired condition thereof. More specifically, when one of the TADs 104–106 is fired, the voltage at the non-inverting input of the comparator 135 is maintained at a level which is lower than the reference voltage at the inverting input. Accordingly, the output of the comparator 135 will be maintained at a low level, forward biasing the base emitter junction of transistor 132 and the diode 134, allowing transistor 132 to conduct in response to base drive from transistor 126. It is recalled that this condition enables the speech gate 115. As will become more apparent, when it is desired to refire a completed matrix path, the anode voltage of the fired TAD is raised in response to raising the cathode voltage above the cathode marking threshold. The comparator 135 senses this condition and responds by driving its output positively, thereby reverse biasing the diode 134 and preventing the conduction of transistor 132. As a result, transistor 121 will be switched off, removing the bias supply from the junction 118 of the speech gate and disabling such gate. When a matrix path is again completed, by refiring of a TAD coupled to the inlet 103, the comparator 135 will respond to the lowered level of anode voltage to drive the comparator output low, again allowing transistor 132 to conduct, thereby enabling the speech gate and allowing communication.

Figure 3:
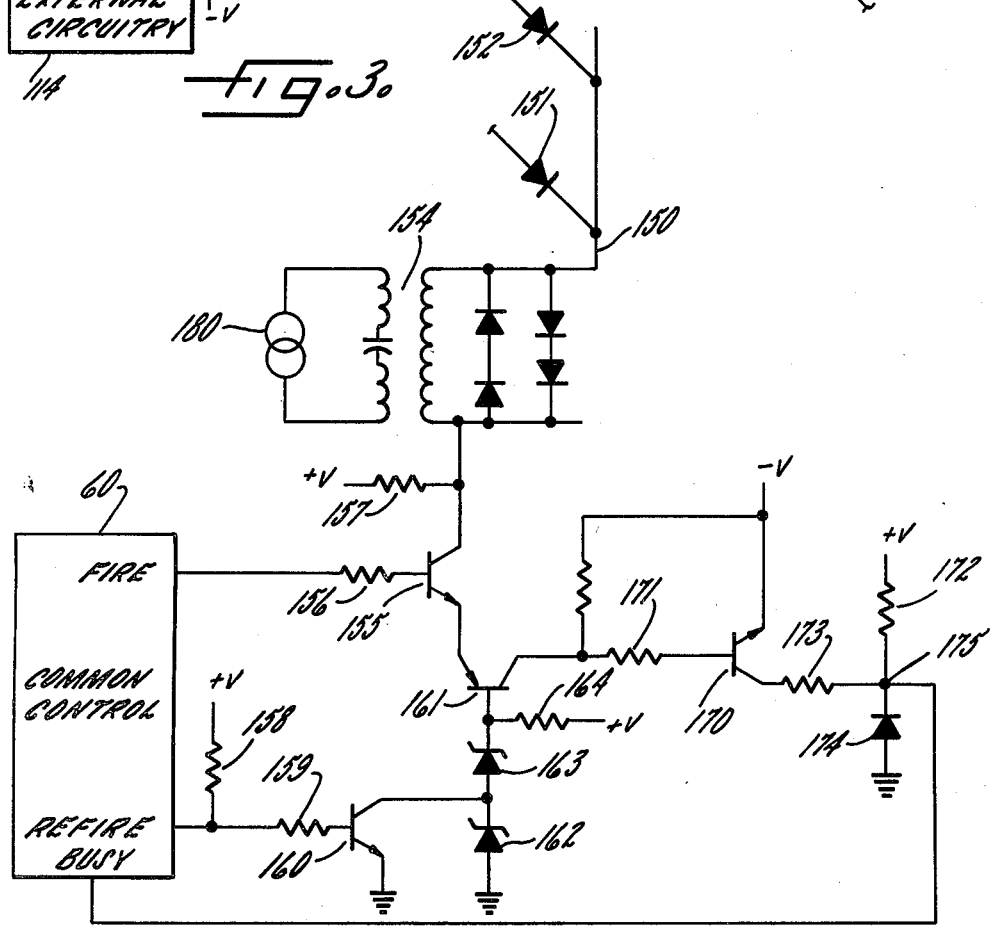
FIG. 3 is a current sink for use in the system of FIG. 1.

Turning now to FIG. 3, there is shown a current sink suitable for use in the switching system according to the present invention, and including means for firing and refiring paths through said matrix to link a plurality of input circuits within a single matrix outlet. It is seen that one of the matrix verticals or outlets 150, having the cathodes of a plurality of TADs 151, 152 coupled thereto, is connected to the input of the current sink. A transformer 154 has a secondary interposed between the current sink and the matrix outlet 150, for providing an impedance across which the analog signals are developed, such secondary having a relatively low d.c. impedance but a relatively high a.c. impedance. A transistor 155 serves as a switching means for activating the current sink to provide an end marking voltage to the matrix outlet 150, thereby to fire all TADs connected to such outlet which have their anodes properly end marked. The transistor 155 is driven by the common control 60 via a resistor 156. Accordingly, when it is desired to complete a path within the matrix, and after the common control has properly end marked the selected TAD anodes, current is provided through resistor 156 driving transistor 155 into conduction. As will become more apparent, during this condition the common control 60 presents a high impedance to the refire input of the current sink, allowing the current flow through resistors 158 and 159 to drive the transistor 160 into conduction. It is seen that the reference voltage at the base of a transistor 161 is established by a reference circuit including Zener diodes 162 and 163 and biasing resistor 164. With transistor 160 conducting, the Zener diode 162 is removed from the reference circuit, thereby establishing the reference voltage at a level determined by the Zener diode 163. Accordingly, when transistor 155 is driven into conduction, the collector thereof will be maintained at a reference level equal to the Zener voltage of Zener diode 163, the base emitter drop of transistor 161, and the collector emitter drop of transistor 155. The Zener voltage of the diode 163 is selected so that the aforementioned reference level is below the cathode end marking threshold for the TAD devices, properly end marking the cathodes of all of the TADs coupled to the matrix outlet 150. Those TADs which additionally have their anodes properly end marked with thus be fired into conduction, with the result described above.

In practicing the invention, means are provided for refiring fired matrix paths, to allow additional input circuits to be inserted into an existing link. To that end, the transistor 160 has its base circuit driven by the common control 60 via the resistor 159. Accordingly, when the common control is activated to refire a path, a low signal is applied at the refire terminal, sinking current through resistor 158 and causing transistor 160 to be driven into cut-off. The Zener diode 162 is thereby added to the reference section raising the reference level at the collector of conducting transistor 155 to a value determined by the sum of the Zener voltages of diodes 162 and 163, the base emitter drop of transistor 161, and the emitter collector drop of transistor 155. The value of Zener diode 162 is selected so that the aforementioned reference level is above the cathode end marking threshold for the TADs. The fired TADs are maintained in conduction because the current sink continues to draw a current through such TADs exceeding the holding current level. At this time, the anodes of one or more additional TADs to be inserted into the existing link, are end marked by activating the current sources associated therewith. The common control then raises the voltage at the refire output causing transistor 160 to be driven into conduction, removing Zener diode 162 from the reference section. As a result, the output voltage of the current sink, as seen at matrix outlet 103, ramps downwardly through the cathode threshold, firing the TADs whose anodes were newly end marked to link them with the previously conducting TADs. While the aforementioned mode of operation is preferred, in certain cases it may prove desirable to allow the conductive TADs to release during the refiring operation, and to cause all the selected TADs to fire when transistor 160 is returned to its conductive state.

In order to detect the busy condition of a current sink, means are provided for responding to the current flow therethrough, shown herein as transistor 170. It is seen that the transistor 170 has its emitter coupled to a negative bias supply, and its base coupled via a resistor 171 to the collector of the transistor 161. Accordingly, the base drive to transistor 170 is dependent upon the amount of current flowing through the emitter-collector circuit of transistor 155, or, in other words, on the number of current sources conducting into the matrix outlet 150. The output signal from the sensing circuit is taken at a junction 175 formed between resistors 172 and 173 and clamping diode 174, the resistor 173 being coupled to the collector of transistor 170. This biasing circuitry for transistor 170 is arranged so that the output signal at the aforementioned junction is at a low level whenever transistor 155 is conducting TAD holding current, indicating the busy condition of the current sink. Alternatively, the biasing circuit may be arranged so that the level of the voltage at the junction 175 is an indication of the number of TADs conducting current to current sink transistor 155. The busy signal produced at the junction 175 is coupled to the common control 60 where it may be used as a feedback signal in a hold path, gated with a release mechanism within the common control to release the path when the signal rises to a high level. It will be appreciated that the signal rises to the aforementioned high level when the current sources coupled to the anodes of one or more of the conducting TADs are deactivated (such as in response to the return of a telephone to an on-hook condition), indicating the termination of the call maintained within the link.

As a further advantage of the illustrated circuit, it is seen that a tone supply 180 is inductively coupled to the current sink via transformer 154. As is well known, the tone supply is a portion of the common control adapted to provide signals such as dial tones, busy signals, etc. It is seen that in the illustrated embodiment a single tone supply 180 may be bussed to a plurality of current sinks, thereby allowing the tone supply to service a plurality of circuits.

Understanding of the circuitry described above will be enhanced with reference to FIG. 4. There is shown a diagram illustrating the relationships between the anode voltage 200 and cathode voltage 201 for a typical TAD thyristor. During the idle or quiescent condition, the anode voltage is maintained at a low level, a clamping effect being provided by transistor 139 (FIG. 2). Similarly, the cathode is maintained at a relatively high level by the positive bias provided through resistor 157 (FIG. 3). In order to fire a crosspoint, the anode must be first end marked by raising the voltage thereof beyond the anode end marking threshold. During the period labeled "anode mark", it is seen that the voltage at the anode is raised from substantially zero volts to a positive level above the anode threshold illustrated at 202. After a predetermined delay period the cathode of the TAD may then be end marked to fire the TAD into conduction. Accordingly, during the period labeled "cathode mark" the voltage at the cathode of the TAD is driven to a low level, below the cathode threshold illustrated at 203. As the voltage passes through the threshold 203, the gating circuitry associated with the TAD thyristor causes the generation of a gating pulse which serves to drive the TAD into conduction. Such gating circuitry is not described herein, as it is fully described in the aforementioned patents and publications. However, as shown in FIG. 4, after the cathode voltage passes through the cathode threshold 203, the TAD begins to switch into conduction, ultimately ramping the anode voltage downward at the point labeled "firing", and causing the anode voltage to follow the cathode voltage less the thyristor drop. In the condition on the diagram labeled "busy", it is seen that the TAD is in a fired, low impedance condition, wherein the anode voltage is below the anode threshold, preventing the firing of further TADs in the associated matrix row. Similarly, the cathode voltage is below the cathode threshold preventing the generation of gate pulses to fire further TADs in the associated matrix column. However, when it is desired to add new inlets to an existing link, a refire operation is executed. As illustrated in the diagram, the anode 200a of one or more additional crosspoints are marked (by marking the associated matrix inlets) during the period labeled "new anode mark". The refire circuitry is then activated to raise the matrix outlet voltage 201, as seen at the cathode of all the crosspoints coupled to such outlet. It is seen that the voltage 201 is raised to a level above the cathode threshold 203. The anode voltage 200 of the previously conducting crosspoint follows the cathode voltage (less the thyristor drop) because such crosspoint remains conductive. At the point labeled cathode re-mark, the cathode voltage 201 is again ramped through the cathode threshold 203 causing crosspoints with their anodes properly end marked to generate an internal gating pulse. Accordingly the new TADs switch into conduction as illustrated by anode voltage 200a ramping downwardly to follow the cathode voltage 201 (in conjunction with anode voltage 200) less the respective thyristor drops. In this condition a voltage change at the anode of any of the conductive TADs is felt at the anode of the other conductive TADs allowing communication between the circuits coupled to the associated matrix inlets.

It will now be apparent that the invention provides an improved switching system wherein selected matrix inlets may be linked by firing associated TADs into a common matrix outlet, such outlet serving as a link between the paths. While the invention has been described in connection with a preferred embodiment utilizing the TAD thyristor, it will be apparent that other forms of electronic switching elements may be used without departing from the invention. Additionally, the terms vertical and horizontal have been adopted to provide a reference as an aid to understanding, and have not been used in a limiting sense. Finally, in the illustrated system it was desirable to control refiring in the current sink because of the characteristics of the TAD; in other applications, it may be desirable to control refiring within the current source.

We claim as our invention:

1. An end mark controlled switching system comprising in combination, a matrix having a plurality of inlets intersecting a plurality of outlets, electronic crosspoint means at the intersections coupling the inlets to the outlets, and means for selectively firing paths within said matrix linking selected inlets, said firing means comprising means for end marking at least two selected matrix inlets and a single selected matrix outlet to fire the electronic crosspoints coupling the respective selected inlets to the selected outlet, whereby said selected outlet forms a link between the selected inlets.

2. The switching system as set forth in claim 1 further including means for selectively refiring paths within said matrix, said refiring means including means for end marking a newly selected matrix inlet, means for temporarily removing the end mark from the selected matrix outlet, said refiring means serving to reapply the end mark to the selected matrix outlet thereby to fire the electronic crosspoint coupling the newly selected inlet to the selected outlet, adding the newly selected inlet to said link.

3. An end mark controlled switching system comprising in combination, a matrix having a plurality of inlets intersecting a plurality of outlets, electronic crosspoint means at the intersections coupling the inlets to the outlets, means for selectively firing the electronic crosspoints to fire paths within said matrix linking at least two selected matrix inlets within a selected outlet, and means for selectively refiring fired paths to allow crosspoints associated with other selected inlets to be fired into a fired path adding said other selected inlets to said link.

4. An end mark controlled switching system comprising in combination, a matrix having a plurality of inlets intersecting a plurality of outlets, electronic crosspoint means at the intersections coupling each of the inlets to each of the outlets, said electronic crosspoint means being of the type adapted to be fired into conduction by respective end marking voltages applied to the associated inlet and outlet of said matrix, inlet end marking means coupled to the respective matrix inlets for selectively end marking associated matrix inlets, outlet end marking means coupled to the respective matrix outlets for selectively end marking associated matrix outlets, and control means for activating the inlet end marking means associated with at least two selected inlets in conjunction with the outlet end marking means associated with a single selected outlet, thereby to fire the electronic crosspoint means coupling the respective selected inlets to the selected outlet for linking said selected inlets.

5. The switching system as set forth in claim 4 wherein said control means includes means for activating the inlet end marking means associated with a newly selected inlet, said switching system further including refiring means for causing the activated outlet end marking means to temporarily remove then reapply the outlet end mark thereby to fire the crosspoint coupling the newly selected inlet into said single selected outlet, adding said newly selected inlet to said link.

6. The switching system as set forth in claim 4 wherein the electronic crosspoint means comprise respective *Trigger Point Adjustable Diodes*.

7. The switching system as set forth in claim 4 wherein the inlet end marking means includes a plurality of current sources, individual ones of the current sources being coupled to respective matrix inlets, said current sources including means for generating an inlet marking voltage exceeding a predetermined threshold and for producing a current in excess of a level necessary to maintain the electronic crosspoint means in conduction.

8. The switching system as set forth in claim 4 wherein said outlet end marking means includes a plurality of current sinks, individual ones of the current sinks being coupled to respective matrix outlets, said current sinks including means for generating an outlet marking voltage of a level less than a predetermined threshold and for drawing a current in excess of a level necessary to maintain the electronic crosspoint means in conduction.

9. The switching system as set forth in claim 4 further including a plurality of input circuits for interfacing external circuits to said matrix, said input circuits being associated with respective ones of the inlet end marking means, said input circuits including respective speech gates responsive to the associated matrix inlet for enabling the passage of signals between the external circuits and the associated matrix inlet only when one of the electronic crosspoints coupled to said matrix inlet is in a fired condition.

10. An end mark controlled switching system comprising in combination, a plurality of thyristors each having an anode and a cathode, said thyristors being of the type adapted to be fired into conduction in response to the application of respective end marking voltages to the anode and cathode thereof, said thyristors forming a matrix being connected in rows and columns as crosspoints between inlets and outlets of said matrix with each row including a group of thyristors having their anodes connected in common and their cathodes separately connected, and each column including another group of thyristors having their cathodes connected in common and their anodes separately connected, anode end marking means coupled to the respective matrix inlets for end marking the anodes of the thyristors coupled in the associated rows, cathode end marking means coupled to the respective matrix outlets for end marking the cathodes of the thyristors coupled in the associated columns, and control means operative upon said anode and cathode end marking means for activating the anode end marking means associated with at least two selected matrix inlets and the cathode end marking means associated with a single selected matrix outlet to fire the thyristors connecting the respective selected inlets to the selected outlet, thereby to link said selected inlets.

11. The switching system as set forth in claim 10 wherein the thyristors comprise respective *Trigger Point Adjustable Diodes*.

12. The switching system as set forth in claim 11 wherein the anode end marking means includes a plurality of current sources, individual ones of the current sources being coupled to respective matrix inlets, said current sources including means for generating an anode marking voltage exceeding a predetermined threshold and for producing a current in excess of a predetermined holding current level of said *Trigger Point Adjustable Diodes*.

13. The switching system as set forth in claim 12 wherein said control means is operative to deactivate the current source coupled to one of said selected matrix inlets, whereby current flow through the *Trigger Point Adjustable Diode* coupling the last mentioned inlet to said selected outlet falls below said holding current level, releasing the last mentioned inlet from said link.

14. The switching system as set forth in claim 11 wherein said cathode end marking means includes a plurality of current sinks, individual ones of the current sinks being coupled to respective matrix outlets, said current sinks including means for generating a cathode end marking voltage of a level less than a predetermined threshold and for drawing a current exceeding a predetermined holding current level of said *Trigger Point Adjustable Diodes*.

15. The switching system as set forth in claim 11 further including a plurality of input circuits for interfacing external circuits to said matrix, said input circuits being associated with respective ones of the anode end marking means, said input circuits including respective speech gates responsive to the associated matrix inlet for enabling the passage of signals between the external circuits and the associated matrix inlet only when one of the thyristors coupled to said matrix inlet is in a fired condition.

16. The switching system as set forth in claim 15 wherein the speech gate includes means for comparing the voltage on the associated matrix inlet with a predetermined reference voltage for disabling said speech gate when the voltage on the matrix inlet exceeds said predetermined reference.

17. The switching system as set forth in claim 11 wherein the cathode end marking means comprises a plurality of current sinks, individual ones of the current sinks being coupled to respective matrix outlets, each of said current sinks including firing means for setting a reference voltage level for said current sink at a first level below a cathode end marking threshold, and refiring means operative in conjunction with said firing means for raising the reference voltage level for said current sink to a second level above said cathode end marking threshold, said refiring means serving to temporarily maintain said current sink at said second level to allow said control means to activate additional anode end marking means for selecting additional matrix inlets, said refiring means serving to return said current sink to said first level thereby to fire the thyristors connecting said additional matrix inlets with said selected outlet thereby to link said selected inlets and said additional inlets.

18. A method of selectively linking inlets in a switching matrix of the type including a plurality of inlets intersecting a plurality of outlets, electronic crosspoint means at the respective intersections and adapted to be fired into conduction in response to end marks applied to the associated inlet and outlet, said method comprising the steps of selecting two or more inlets to be linked, end marking the selected inlets, selecting an available outlet, end marking said selected outlet while continuing the end marking of said selected inlets, thereby to fire the corsspoints coupling said inlets to said outlet, linking said inlets in said outlet.

19. The method as set forth in claim 18 further including the steps of selecting an additional inlet for connection into said link, end marking said additional inlet, and refiring said selected outlet to link said additional inlet and said selected inlets.

20. The method as set forth in claim 18 further including the step of terminating the end marking of one of said selected inlets thereby to release said last mentioned inlet from said link.

21. A method of selectively linking inlets in a switching matrix of the type including a plurality of inlets intersecting a plurality of outlets, thyristors at the respective intersections and adapted to be fired into conduction in response to the concurrent presence of an inlet end marking voltage above an inlet end marking threshold and an outlet end marking voltage below an outlet end marking threshold, said method comprising the steps of selecting two or more inlets to be connected, raising the voltage on said selected inlets above said inlet end marking threshold, selecting an available outlet, lowering the voltage on said available outlet below the outlet end marking threshold thereby to fire the thyristors coupling said selected inlets to said available outlet, forming a link between said selected inlets within said available outlet.

22. The method as set forth in claim 21 including the step of releasing the end marking voltage on at least one of the selected inlets thereby to release the last mentioned inlet from said link.

23. The method as set forth in claim 21 further including the steps of selecting an additional inlet to be connected in said link, raising the end marking voltage on said additional inlet above said inlet end marking threshold, raising the voltage on said available outlet above the outlet end marking threshold, and lowering the voltage on said available outlet below said outlet end marking threshold thereby to fire the thyristor coupling said additional inlet to said available outlet, adding said additional inlet to said link.

* * * * *